(12) United States Patent
Cardinali et al.

(10) Patent No.: US 12,458,751 B2
(45) Date of Patent: Nov. 4, 2025

(54) FLUID DELIVERY DEVICE HAVING MULTIPLE PENETRATING ELEMENTS

(71) Applicant: Insulet Corporation, Acton, MA (US)

(72) Inventors: Steven Cardinali, Tewksbury, MA (US); David Nazzaro, Groveland, MA (US); Ian McLaughlin, Groton, MA (US)

(73) Assignee: INSULET CORPORATION, Acton, MA (US)

( * ) Notice: Subject to any disclaimer, the term of this patent is extended or adjusted under 35 U.S.C. 154(b) by 818 days.

(21) Appl. No.: 17/492,103

(22) Filed: Oct. 1, 2021

(65) Prior Publication Data

US 2022/0105267 A1    Apr. 7, 2022

Related U.S. Application Data

(60) Provisional application No. 63/086,686, filed on Oct. 2, 2020.

(51) Int. Cl.
*A61M 5/158* (2006.01)
*A61M 5/172* (2006.01)

(52) U.S. Cl.
CPC .......... *A61M 5/158* (2013.01); *A61M 5/1723* (2013.01); *A61M 2005/1585* (2013.01);
(Continued)

(58) Field of Classification Search
CPC .......... A61M 2005/1585; A61M 2005/14252; A61M 2005/1726; A61M 5/1723; A61M 2230/201; A61M 5/158
See application file for complete search history.

(56) References Cited

U.S. PATENT DOCUMENTS

| 441,663 | A | 12/1890 | Hofbauer |
| 955,911 | A | 4/1910 | Saegmuller |

(Continued)

FOREIGN PATENT DOCUMENTS

| CA | 2863379 A1 | 8/2013 |
| CN | 201134101 Y | 10/2008 |

(Continued)

OTHER PUBLICATIONS

International Search Report and Written Opinion for the International Patent Application No. PCT/US2021/047690, mailed Jan. 14, 2022, 13 pages.

(Continued)

*Primary Examiner* — Courtney B Fredrickson
*Assistant Examiner* — Kayla M. Turkowski
(74) *Attorney, Agent, or Firm* — GOODWIN PROCTER LLP

(57) ABSTRACT

Methods and apparatuses for performing an insertion process for a plurality of penetrating elements are described. For example, a wearable fluid infusion device may include a cannula and/or needle for infusing a fluid into a patient and a sensor for sensing a physical characteristic of the patient. A non-limiting example of a fluid may be or may include insulin. An illustrative and non-restrictive example of a physical characteristic may include a blood glucose level. The wearable infusion device may be configured to facilitate insertion of the multiple penetrating elements, such as a cannula and a sensor, in a single simultaneous insertion step instead of requiring individual insertion steps for each of multiple penetrating elements. Other embodiments are described.

9 Claims, 8 Drawing Sheets

(52) U.S. Cl.
CPC .............. *A61M 2005/1726* (2013.01); *A61M 2230/201* (2013.01)

(56) References Cited

U.S. PATENT DOCUMENTS

| | | | |
|---|---|---|---|
| 4,206,401 A | 6/1980 | Meyer | |
| 4,277,226 A | 7/1981 | Archibald | |
| 4,307,713 A | 12/1981 | Galkin et al. | |
| 4,398,542 A | 8/1983 | Cunningham et al. | |
| 4,560,979 A | 12/1985 | Rosskopf | |
| 4,587,850 A | 5/1986 | Moser | |
| 4,801,957 A | 1/1989 | Vandemoere | |
| 4,836,752 A | 6/1989 | Burkett | |
| 4,850,954 A | 7/1989 | Charvin | |
| 4,882,600 A | 11/1989 | Van de Moere | |
| 4,961,055 A | 10/1990 | Habib et al. | |
| 4,973,998 A | 11/1990 | Gates | |
| 5,045,871 A | 9/1991 | Reinholdson | |
| 5,239,326 A | 8/1993 | Takai | |
| 5,452,033 A | 9/1995 | Balling et al. | |
| 5,563,584 A | 10/1996 | Rader et al. | |
| 5,576,781 A | 11/1996 | Deleeuw | |
| 5,585,733 A | 12/1996 | Paglione | |
| 5,586,553 A | 12/1996 | Halili et al. | |
| 5,647,853 A | 7/1997 | Feldmann et al. | |
| 5,660,163 A | 8/1997 | Schulman et al. | |
| 5,726,404 A | 3/1998 | Brody | |
| 5,726,751 A | 3/1998 | Altendorf et al. | |
| 5,785,681 A | 7/1998 | Indravudh et al. | |
| 5,800,420 A | 9/1998 | Gross et al. | |
| 5,830,999 A | 11/1998 | Dunn | |
| 5,867,688 A | 2/1999 | Simmon et al. | |
| 5,899,882 A | 5/1999 | Waksman et al. | |
| 6,171,264 B1 | 1/2001 | Bader | |
| 6,381,029 B1 | 4/2002 | Tipirneni | |
| 6,685,452 B2 | 2/2004 | Christiansen et al. | |
| 6,768,319 B2 | 7/2004 | Wang | |
| 6,830,558 B2 | 12/2004 | Flaherty et al. | |
| 7,018,360 B2 | 3/2006 | Flaherty et al. | |
| 7,128,727 B2 | 10/2006 | Flaherty et al. | |
| 7,144,384 B2 | 12/2006 | Gorman et al. | |
| 7,182,726 B2 | 2/2007 | Williams et al. | |
| 7,303,073 B2 | 12/2007 | Raynal-Olive et al. | |
| 8,056,719 B2 | 11/2011 | Porret et al. | |
| 8,105,282 B2 | 1/2012 | Susi et al. | |
| 8,285,487 B2 | 10/2012 | Bergstrom et al. | |
| 8,454,557 B1 | 6/2013 | Qi et al. | |
| 8,461,561 B2 | 6/2013 | Freeman et al. | |
| 8,727,117 B2 | 5/2014 | Maasarani | |
| 9,005,166 B2 | 4/2015 | Uber, III et al. | |
| 9,248,229 B2 | 2/2016 | Devouassoux et al. | |
| 9,427,710 B2 | 8/2016 | Jansen | |
| 9,598,195 B2 | 3/2017 | Deutschle et al. | |
| 9,862,519 B2 | 1/2018 | Deutschle et al. | |
| 10,046,114 B1 | 8/2018 | Biederman et al. | |
| 10,086,131 B2 | 10/2018 | Okihara | |
| 10,342,926 B2 | 7/2019 | Nazzaro et al. | |
| 10,441,717 B2 | 10/2019 | Schmid et al. | |
| 2002/0032374 A1 | 3/2002 | Holker et al. | |
| 2002/0161307 A1 | 10/2002 | Yu et al. | |
| 2003/0073952 A1 | 4/2003 | Flaherty et al. | |
| 2004/0010207 A1 | 1/2004 | Flaherty et al. | |
| 2004/0010507 A1 | 1/2004 | Bellew | |
| 2004/0085215 A1 | 5/2004 | Moberg et al. | |
| 2004/0215492 A1 | 10/2004 | Choi | |
| 2005/0055242 A1 | 3/2005 | Bello et al. | |
| 2005/0238507 A1 | 10/2005 | Dilanni et al. | |
| 2006/0086909 A1 | 4/2006 | Schaber | |
| 2006/0092569 A1 | 5/2006 | Che et al. | |
| 2006/0253085 A1* | 11/2006 | Geismar ........... A61M 5/14244 | |
| | | | 600/327 |
| 2006/0264926 A1 | 11/2006 | Kochamba | |
| 2006/0282290 A1 | 12/2006 | Flaherty et al. | |
| 2007/0027370 A1 | 2/2007 | Brauker et al. | |
| 2007/0078784 A1 | 4/2007 | Donovan et al. | |
| 2007/0118405 A1 | 5/2007 | Campbell et al. | |
| 2007/0179885 A1 | 8/2007 | Bird et al. | |
| 2007/0191770 A1 | 8/2007 | Moberg et al. | |
| 2007/0233051 A1 | 10/2007 | Hohl et al. | |
| 2008/0004515 A1 | 1/2008 | Jennewine | |
| 2008/0027371 A1 | 1/2008 | Higuchi et al. | |
| 2008/0033272 A1 | 2/2008 | Gough et al. | |
| 2008/0077081 A1 | 3/2008 | Mounce et al. | |
| 2008/0173073 A1 | 7/2008 | Downie et al. | |
| 2008/0255438 A1 | 10/2008 | Saidara et al. | |
| 2008/0269723 A1 | 10/2008 | Mastrototaro et al. | |
| 2008/0281290 A1 | 11/2008 | Yodfat et al. | |
| 2009/0048556 A1 | 2/2009 | Durand | |
| 2009/0062767 A1 | 3/2009 | Van Antwerp et al. | |
| 2009/0069787 A1 | 3/2009 | Estes et al. | |
| 2009/0112769 A1 | 4/2009 | Dicks et al. | |
| 2009/0177142 A1 | 7/2009 | Blomquist et al. | |
| 2009/0254041 A1 | 10/2009 | Krag et al. | |
| 2010/0076275 A1 | 3/2010 | Chu et al. | |
| 2010/0094251 A1 | 4/2010 | Estes | |
| 2010/0114026 A1 | 5/2010 | Karratt et al. | |
| 2010/0137784 A1 | 6/2010 | Cefai et al. | |
| 2010/0145272 A1 | 6/2010 | Cefai et al. | |
| 2010/0185175 A1 | 7/2010 | Kamen et al. | |
| 2010/0286997 A1 | 11/2010 | Srinivasan | |
| 2011/0124996 A1 | 5/2011 | Reinke et al. | |
| 2011/0142688 A1 | 6/2011 | Chappel et al. | |
| 2011/0152658 A1 | 6/2011 | Peyser et al. | |
| 2011/0213306 A1 | 9/2011 | Hanson et al. | |
| 2011/0218495 A1 | 9/2011 | Remebe | |
| 2011/0225024 A1 | 9/2011 | Seyer et al. | |
| 2011/0246235 A1 | 10/2011 | Powell et al. | |
| 2011/0313680 A1 | 12/2011 | Doyle, III | |
| 2011/0316562 A1 | 12/2011 | Cefai et al. | |
| 2012/0029941 A1 | 2/2012 | Malave et al. | |
| 2012/0050046 A1 | 3/2012 | Satorius et al. | |
| 2012/0054841 A1 | 3/2012 | Schultz et al. | |
| 2012/0153936 A1 | 6/2012 | Romani et al. | |
| 2012/0182939 A1 | 7/2012 | Rajan et al. | |
| 2012/0184909 A1 | 7/2012 | Gyrn | |
| 2012/0203085 A1 | 8/2012 | Rebec | |
| 2012/0232520 A1 | 9/2012 | Sloan et al. | |
| 2012/0265166 A1 | 10/2012 | Yodfat | |
| 2012/0277667 A1 | 11/2012 | Yodat et al. | |
| 2013/0030841 A1 | 1/2013 | Bergstrom et al. | |
| 2013/0036100 A1 | 2/2013 | Nagpal et al. | |
| 2013/0060194 A1 | 3/2013 | Rostein | |
| 2013/0080832 A1 | 3/2013 | Dean et al. | |
| 2013/0138452 A1 | 5/2013 | Cork et al. | |
| 2013/0173473 A1 | 7/2013 | Birtwhistle et al. | |
| 2013/0245545 A1 | 9/2013 | Arnold et al. | |
| 2013/0274576 A1 | 10/2013 | Amirouche et al. | |
| 2014/0114277 A1 | 4/2014 | Eggert et al. | |
| 2014/0128839 A1* | 5/2014 | Dilanni ............... A61M 5/1723 | |
| | | | 604/504 |
| 2014/0163664 A1 | 6/2014 | Goldsmith | |
| 2014/0180203 A1 | 6/2014 | Budiman et al. | |
| 2015/0038898 A1 | 2/2015 | Palmer et al. | |
| 2015/0057913 A1 | 2/2015 | Benhammou | |
| 2015/0119666 A1 | 4/2015 | Brister et al. | |
| 2015/0164545 A1* | 6/2015 | Gyrn ................... A61M 5/158 | |
| | | | 600/300 |
| 2015/0290391 A1 | 10/2015 | Schmid et al. | |
| 2016/0022905 A1 | 1/2016 | Nagar et al. | |
| 2016/0184517 A1 | 6/2016 | Baek et al. | |
| 2016/0339172 A1 | 11/2016 | Michaud et al. | |
| 2017/0173261 A1 | 6/2017 | O'Connor et al. | |
| 2018/0040255 A1 | 2/2018 | Freeman et al. | |
| 2018/0280609 A1 | 10/2018 | Nishimura et al. | |
| 2018/0296757 A1 | 10/2018 | Finan et al. | |
| 2023/0011504 A1* | 1/2023 | Jeon ................... A61M 5/1723 | |

FOREIGN PATENT DOCUMENTS

| | | |
|---|---|---|
| EP | 1762263 A1 | 3/2007 |
| EP | 1839694 A1 | 10/2007 |
| EP | 1852703 A1 | 11/2007 |
| EP | 2099384 A1 | 9/2009 |
| EP | 2353628 A2 | 8/2011 |

(56) References Cited

FOREIGN PATENT DOCUMENTS

| | | | |
|---|---|---|---|
| EP | 1874390 | B1 | 10/2014 |
| EP | 3068290 | A1 | 9/2016 |
| EP | 3187201 | A1 | 7/2017 |
| EP | 3598942 | A1 | 1/2020 |
| EP | 3607985 | A1 | 2/2020 |
| ES | 2559866 | T3 | 2/2016 |
| GB | 1401588 | A | 7/1975 |
| GB | 2176595 | A | 12/1986 |
| GB | 2443260 | A | 4/2008 |
| GB | 2443261 | A | 4/2008 |
| GB | 2461086 | A | 12/2009 |
| GB | 2495014 | A | 3/2013 |
| GB | 2524717 | A | 10/2015 |
| GB | 2525149 | A | 10/2015 |
| JP | 2001190659 | A | 7/2001 |
| JP | 2003154190 | A | 5/2003 |
| JP | 2007144141 | A1 | 6/2007 |
| JP | 2007307359 | A | 11/2007 |
| JP | 2008242502 | A | 10/2008 |
| JP | 2012210441 | A | 11/2012 |
| WO | 9801071 | A1 | 1/1998 |
| WO | 9819145 | A1 | 5/1998 |
| WO | 9824495 | A1 | 6/1998 |
| WO | 9841267 | A1 | 9/1998 |
| WO | 0010628 | A2 | 3/2000 |
| WO | 0013580 | A1 | 3/2000 |
| WO | 0019887 | A1 | 4/2000 |
| WO | 0061215 | A1 | 10/2000 |
| WO | 0078210 | A1 | 12/2000 |
| WO | 2005031631 | A2 | 4/2005 |
| WO | 2006060668 | A2 | 6/2006 |
| WO | 2007112034 | A2 | 10/2007 |
| WO | 2008024814 | A2 | 2/2008 |
| WO | 2009023634 | A2 | 2/2009 |
| WO | 2009032399 | A1 | 3/2009 |
| WO | 2010025433 | A1 | 3/2010 |
| WO | 2010078434 | A2 | 7/2010 |
| WO | 2010146579 | A1 | 12/2010 |
| WO | 2011012465 | A1 | 2/2011 |
| WO | 2011133823 | A1 | 10/2011 |
| WO | 2013149186 | A1 | 10/2013 |
| WO | 2014136105 | A1 | 9/2014 |
| WO | 2015187793 | A1 | 12/2015 |
| WO | 2016041873 | A1 | 3/2016 |
| WO | 2016181384 | A2 | 11/2016 |
| WO | 2017089289 | A1 | 6/2017 |
| WO | 2017205816 | A1 | 11/2017 |
| WO | 2019043702 | A1 | 3/2019 |
| WO | 2019094440 | A1 | 5/2019 |
| WO | 2020124058 | A1 | 6/2020 |

OTHER PUBLICATIONS

International Search Report and Written Opinion for the International Patent Application No. PCT/US2022/055745, mailed Feb. 14, 2022, 13 pages.
International Search Report and Written Opinion for the International Patent Application No. PCT/US2021/053162, mailed Mar. 28, 2022, 18 pages.
International Search Report and Written Opinion for the International Patent Application No. PCT/US2021/064041, mailed Apr. 29, 2022, 11 pages.
International Search Report and Written Opinion for the International Patent Application No. PCT/US2022/015809, mailed Jun. 20, 2022, 15 pages.
International Search Report and Written Opinion for International Patent Application No. PCT/US2022/029012, mailed Aug. 19, 2022, 12 pages.
European Search Report for the European Patent Application No. EP03743667, dated Jul. 22, 2008.
International Search Report and Written Opinion mailed Sep. 9, 2016, issued in PCT Patent Application No. PCT/US2016/037189, 12 pages.
Preliminary Report on Patentability mailed Dec. 21, 2017, issued in PCT Patent Application No. PCT/US2016/037189.
U.K. Intellectual Property Office, GB Application No. GB 1401587.9, "Search Report under Section 17(5)" Aug. 11, 2015, 1 page.
International Search Report and Written Opinion for PCT Application No. PCT/GB2015/050247, May 8, 2015, 14 pages.
Extended Search Report mailed Nov. 24, 2017, issued in European Patent Application No. 15779465.2, 10 pages.
International Search Report and Written Opinion for PCT Application No. PCT/US15/26875, mailed Jan. 18, 2016, 10 pages.
U.K. Intellectual Property Office, GB Application No. GB 1401588.7, "Search Report under Section 17(5)" Aug. 17, 2015, 1 page.
U.K. Intellectual Property Office, GB Application No. GB 1401589.5, "Search Report under Section 17" Jul. 27, 2015, 1 page.
International Search Report and Written Opinion for PCT Application No. PCT/GB2015/050250, May 7, 2015, 9 pages.
3GPP TS 23.003 V10.0.0.0 Numbering, addressing and identification. Dec. 2010.
International Search Report and Written Opinion for PCT Application No. PCT/GB2015/050251, Jun. 12, 2015, 9 bages.
European Search Report for the European Patent Application No. EP19194241, dated Oct. 22, 2019, 6 pages.
International Preliminary Report on Patentability for PCT/US2017/061095, issued on May 14, 2019, 6 pages.
International Search Report and Written Opinion for PCT/US18/52468, mailed on Feb. 26, 2019, 16 pages.
International Search Report and Written Opinion for PCT/US2017/061095, mailed on Feb. 20, 2018, 8 pages.
International Preliminary Report on Patentability in PCT/US2021/053162 mailed on Apr. 13, 2023, 12 pages.

\* cited by examiner

FLUID DELIVERY DEVICE HAVING MULTIPLE PENETRATING ELEMENTS

CROSS-REFERENCE TO RELATED APPLICATIONS

This application claims the benefit to U.S. Provisional Application No. 63/086,686, filed Oct. 2, 2020, the entire contents of which are incorporated herein by reference in their entirety.

FIELD OF THE INVENTION

The present disclosure generally relates to wearable devices having a plurality of penetrating elements, such as needles, cannulas, or wires, for facilitating various device functions, including fluid delivery and/or measuring physiological parameters.

BACKGROUND

Diabetes mellitus is a serious medical condition caused by an inability to adequately control blood glucose levels. Typical treatments involve monitoring blood glucose levels through automated sensors and/or manual methods combined with insulin injections in an attempt to maintain blood glucose values within a desired, healthy range. Treatment advances for diabetic patients have provided for automatic insulin delivery (AID) systems to control patient insulin levels. For example, an AID system may include a wearable insulin pump that includes a needle or cannula that is inserted into the patient when the AID system is installed on the patient. The wearable insulin pump operates to automatically inject insulin into the patient periodically or based on an event (for instance, user input, a determination that the patient blood sugar is above a threshold value, and/or the like). In another advancement, automated continuous glucose monitors (CGMs) have been developed that include needles or wires inserted into the patient to obtain blood samples for device sensors to monitor blood glucose levels without direct patient involvement.

Although automated blood glucose sensing and insulin delivery devices have been developed, conventional systems have been in the form of independent systems that are installed on the body separately and, therefore, require two different insertions of needles into the skin of the patient. Having to install two different systems, with each requiring their own insertion steps, may be cumbersome to users and lead to a negative user experience, impeding user adoption and proper use of these technologies. Accordingly, diabetes patients would benefit from a system, a device, and/or a technique for more efficiently and effectively providing both automated monitoring and medicament delivery to patients in a single device and needle insertion process.

SUMMARY

This Summary is provided to introduce a selection of concepts in a simplified form that are further described below in the Detailed Description. This Summary is not intended to necessarily identify key features or essential features of the claimed subject matter, nor is it intended as an aid in determining the scope of the claimed subject matter.

In accordance with various aspects of the described embodiments is a fluid delivery device that may include a fluid delivery penetration element operative to be inserted into a patient to deliver a fluid from a fluid delivery system to the patient, a sensor device comprising a sensor penetration element operative to be inserted into the patient to measure patient information of the patient, a catch coupled to the sensor penetration element, and an activation device operative to force the fluid delivery penetration element to be inserted into a portion of the patient, the fluid delivery penetration element to engage the catch when traveling toward the portion of the patient to force the sensor penetration element into the portion of the patient.

In some embodiments of the fluid delivery device, the fluid delivery penetration element may be or may include at least one of a cannula and a needle. In some embodiments of the fluid delivery device, the fluid may be or may include insulin. In various embodiments of the fluid delivery device, the sensor device may be or may include a continuous glucose monitoring (CGM) device, wherein the sensor penetration element comprises a CGM sensor.

In some embodiments of the fluid delivery device, the sensor device may include a housing having a seal arranged on an outer surface thereof, the fluid delivery penetration element to pierce the seal as the fluid delivery penetration element travels to engage the catch.

In various embodiments of the fluid delivery device, the fluid delivery penetration element may include at least one engagement element operative to facilitate engagement of the fluid delivery penetration element with the catch. In exemplary embodiments of the fluid delivery device, the catch may include a funnel. In some embodiments of the fluid delivery device, the catch may be arranged on an insertion needle coupled to the sensor penetration element.

In various embodiments of the fluid delivery device, the fluid delivery device and the sensor device may be independently coupled to the portion of the patient via separate adhesive areas. In some embodiments of the fluid delivery device, the activation device may operate to retract the fluid delivery penetration element from the portion of the patient without removing the sensor penetration element from the portion of the patient.

In accordance with various aspects of the described embodiments is a fluid delivery device that may include a sensor housing having a fluid delivery penetration element and a sensor penetration element arranged therein, the fluid delivery penetration element and the sensor penetration element to be inserted into the patient when the sensor housing is attached to the patient, the fluid delivery penetration element operative to deliver a fluid to the patient, the sensor penetration element operative to measure patient information of the patient, and a main housing having a fluid path arranged therein, the fluid path in fluid communication with a fluid delivery system, the main housing arranged around the sensor housing when attached to the patient to fluidically couple the fluid path to the fluid delivery penetration element to facilitate delivery of the fluid to the patient via the fluid delivery system.

In some embodiments of the fluid delivery device, the fluid path may be or may include a needle configured to engage the fluid delivery penetration element. In some embodiments of the fluid delivery device, the sensor housing may include a septum arranged on a top surface thereof, the needle may be configured to penetrate the septum when the fluid path is fluidically coupled to the fluid delivery penetration element.

In some embodiments of the fluid delivery device, the fluid delivery penetration element may include at least one of a cannula and a needle. In some embodiments of the fluid delivery device, the sensor device may include a continuous glucose monitoring (CGM) device, wherein the sensor penetration element may include a CGM sensor. In some embodiments of the fluid delivery device, the fluid may be or may include insulin.

In some embodiments of the fluid delivery device, the main housing may be configured to be removed from around the sensor housing, de-coupling the fluid path and the fluid delivery penetration element without removing the fluid delivery penetration element or the sensor penetration element from the portion of the patient.

In accordance with various aspects of the described embodiments is a fluid delivery device that may include a fluid delivery penetration element operative to be inserted into a patient to deliver a fluid from a fluid delivery system to the patient, the fluid delivery penetration element coupled to a fluid delivery driving element, a sensor device comprising a sensor penetration element operative to be inserted into the patient to measure patient information of the patient, the sensor penetration element coupled to a sensor driving element, the delivery driving element to couple the fluid delivery penetration element to the sensor penetration element via the sensor driving element, and an activation device operative to force the fluid delivery penetration element to be inserted into a portion of the patient, wherein movement of the fluid delivery penetration element toward the portion of the patient forces the sensor penetration element to be inserted into the portion of the patient.

In some embodiments of the fluid delivery device, a track may be arranged on a portion of a housing of the fluid delivery device, the fluid delivery penetration element and the sensor penetration element may be configured to ride along the track to be inserted into the portion of the patient. In some embodiments of the fluid delivery device, the fluid delivery penetration element and the sensor penetration element may be coupled via at least one interlocking element.

In some embodiments of the fluid delivery device, the fluid delivery penetration element may be or may include at least one of a cannula and a needle. In some embodiments of the fluid delivery device, the sensor device may be or may include a continuous glucose monitoring (CGM) device, wherein the sensor penetration element comprises a CGM sensor. In some embodiments of the fluid delivery device, the fluid may be or may include insulin.

Figure 1:
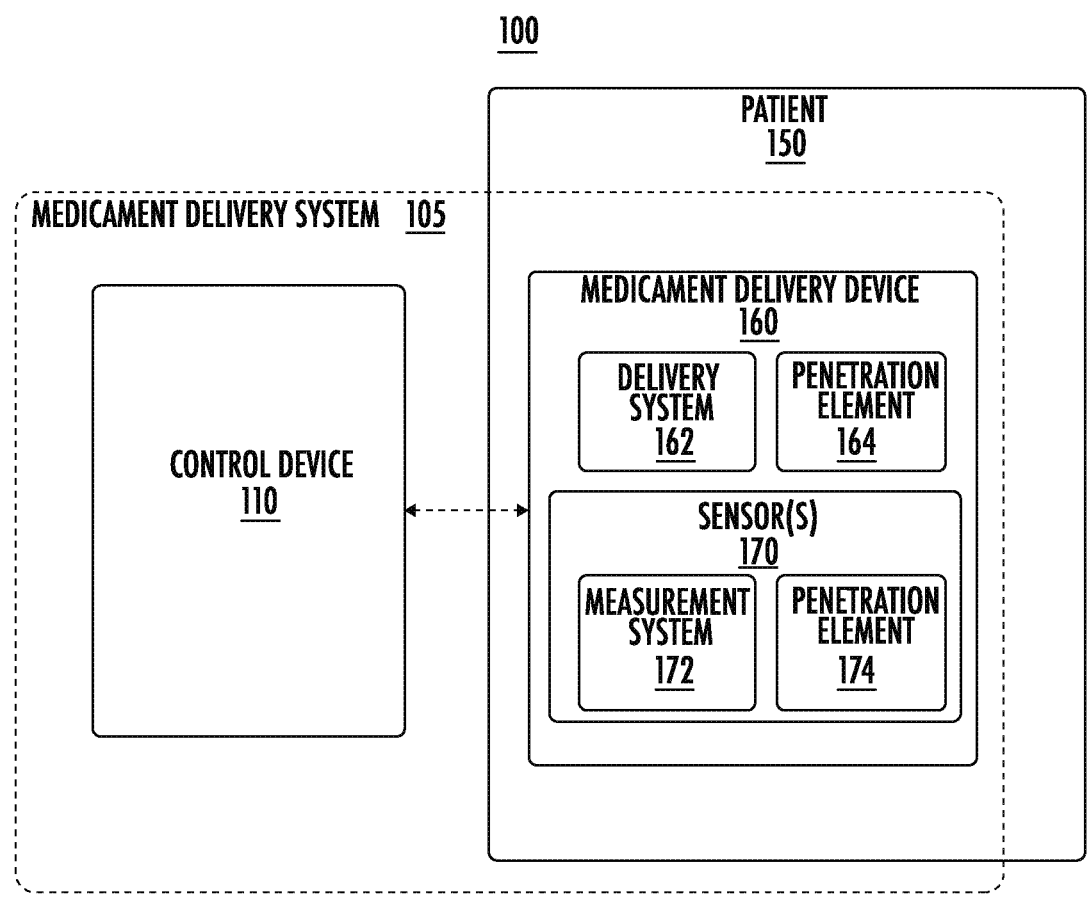
FIG. 1 illustrates a first exemplary operating environment in accordance with the present disclosure.

The drawings are not necessarily to scale. The drawings are merely representations, not intended to portray specific parameters of the disclosure. The drawings are intended to depict example embodiments of the disclosure, and therefore should not be considered as limiting in scope. In the drawings, like numbering represents like elements.

DETAILED DESCRIPTION

The described technology generally relates to a fluid delivery device having a plurality of penetrating elements. In some embodiments, the fluid delivery device may be or may include a medicament delivery device in the form of a wearable device configured to inject a patient with a fluid medicament. The medicament delivery device may be configured to perform additional functions, such as measuring a physical parameter of the patient. Non-limiting examples of penetrating elements may include a needle, a cannula, a microneedle, a projection, a wire, a sensor, a sensor circuit, a tube, an array of any of the foregoing, and/or any other type of element that may extend from the medicament delivery device for contacting and/or penetrating the skin of a patient. In one embodiment, the medicament delivery device may be a wearable insulin pump having a first penetrating element (for instance, a delivery penetrating element) in the form of a cannula or needle for injecting insulin into the patient and a second penetrating element (for instance, a sensing penetrating element) in the form of a cannula or needle or other projection for sensing blood glucose of the patient. The medicament delivery device may be configured to perform an insertion process to insert at least two of the plurality of penetrating elements into the skin of the user. For example, the insertion process may operate to insert the first penetrating element and the second penetrating element in an installation motion. In various embodiments, two or more of the plurality of penetrating elements may be simultaneously or substantially simultaneously inserted into the patient.

Diabetic patients may be treated using automatic insulin delivery (AID) systems to control patient insulin levels. For example, an AID system may include a wearable insulin pump that includes a needle or cannula that is inserted into the patient when the AID system is installed on the patient. In addition, or in the alternative, continuous glucose monitor (CGM) systems have been developed that include needles inserted into the patient to obtain blood samples for device sensors to monitor blood glucose levels without direct patient involvement. Closed-loop systems have been developed in which an insulin pump (e.g., an AID system) and a CGM communicate with each other and may be installed on a patient to provide optimized therapy, for instance, where the CGM measurements are used by the insulin pump to determine insulin injection rates and/or amounts.

Although the combined use of different systems is ultimately beneficial to the patient, the systems are configured in separate devices, requiring multiple installation steps and, therefore, multiple needle penetrations. This can be cumbersome to users and is not ideal for their quality of life, particularly for device systems that are replaced regularly. Accordingly, some embodiments may provide device installation processes that may require less needle (or other penetrating element) penetration steps than required for conventional systems. For example, a conventional closed-loop AID-CGM system may require two different needle/cannula penetration steps, one for the AID needle/cannula and one for the CGM needle (or cannula). In some embodiments, the AID cannula/needle and CGM needle may be installed in a single simultaneous step. In this manner, the patient's user experience and overall treatment quality of life may be improved by providing a more efficient, easier, and less painful system installation process.

Although insulin is used as an illustrative fluid in examples of the present disclosure, embodiments are not so limited. A fluid delivery device may be configured to store and delivery various types of fluids. Non-limiting examples of fluids may include insulin, glucagon or a glucagon-like peptide, pain relief drugs, hormones, blood pressure medicines, morphine, methadone, chemotherapy drugs, proteins, antibodies, and/or the like.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In this Detailed Description, references to "one embodiment," "an embodiment," "example embodiment," "various embodiments," etc., indicate that the embodiment(s) of the technology so described may include particular features, structures, or characteristics, but more than one embodiment may, and not every embodiment necessarily does, include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include a medicament delivery system 105. In various embodiments, medicament delivery system 105 may include a control or computing device 110 that, in some embodiments, may be communicatively coupled to a medicament delivery device 160. Computing device 110 may be or may include one or more logic devices, including, without limitation, a server computer, a client computing device, a personal computer (PC), a workstation, a laptop, a notebook computer, a smart phone, a tablet computing device, a personal diabetes management (PDM) device, and/or the like. Embodiments are not limited in this context.

Medicament delivery device 160 may be or may include an automatic insulin delivery (AID) device configured to deliver insulin (and/or other medication) to patient 150. AID device 160 may be a wearable device. For example, AID device 160 may be directly coupled to patient 150 (for instance, directly attached to a body part and/or skin of the user via an adhesive and/or other attachment component). AID device 160 may include a delivery system 162 having a number of components to facilitate automated delivery of insulin to patient 150 for example, a power source, a reservoir for storing insulin, a pump for transferring insulin from the reservoir, through a conduit, and into the body of patient 150. AID device 160 may include at least one penetration element 164 configured to be inserted into the skin of the patient to operate as a conduit between an insulin reservoir of delivery system 162 and patient 150. For example, penetration element 164 may include a cannula and/or needle. Embodiments are not limited in this context, for example, as delivery system 162 or penetration element 164 may include more or fewer components.

AID device 160 may store and provide any medication or drug to the user. For example, AID device 160 may be or may include a device the same or similar to an OmniPod® device or system provided by Insulet Corporation of Acton, Massachusetts, United States, for example, as described in U.S. Pat. Nos. 7,303,549; 7,137,964; and/or 6,740,059, each of which is incorporated herein by reference in its entirety.

In some embodiments, AID device 160 may include at least one sensor 170 operative to detect, measure, or otherwise determine various physiological characteristics of patient 150. For example, sensor 170 may be or may include a CGM sensor operative to determine blood glucose measurement values of patient 150. In another example, sensor 170 may be or may include a heart rate sensor, temperature sensor, and/or the like.

Sensor 170 may be or may include a CGM sensor the same or similar to CGM sensors now existing or developed in the future, including, without limitation wearable CGM sensors provided by DexCom, Inc. of San Diego, California, United States (e.g., DexCom G4® CGM System) or Abbot Laboratories of Abbot Park, Illinois, United States (e.g., FreeStyle® Libre 2 iCGM).

In various embodiments, sensor device 170 may include a penetration element 174 configured to be inserted into patient 150 to obtain fluid samples, such as blood samples. In some embodiments, penetration element 174 may be or may include a needle, cannula, tube, fiber optic, wire, and/or the like. Measurement system 172 may access fluid samples obtained via penetration element 174 to perform an analysis on the fluid samples, such as determining a blood glucose level from a blood sample.

Accordingly, in various embodiments, AID device 160 may be a closed-loop insulin delivery system using sensor 170 as an internal CGM sensor to provide blood glucose information, either directly or via control device 110, to delivery system 162 to formulate delivery of insulin to patient 150 via penetration element 164.

Although penetration elements are described in the present disclosure (such as penetration elements 164 and 174) as being inserted into the skin of the patient, embodiments are not so limited. For example, a penetration element may be configured as a contacting element configured to contact a portion of the patient while not penetrating the skin. Accordingly, installation of a contact element may include moving, actuating, or otherwise adjusting the contacting element to be in contact with the portion of the patient, such as the skin of the patient.

In some embodiments, computing device 110 may be a smart phone, PDM, or other mobile computing form factor in wired or wireless communication with AID device 160. For example, computing device 110 and AID device 160 may communicate via various wireless protocols, including, without limitation, Wi-Fi (i.e., IEEE 802.11), radio frequency (RF), Bluetooth™, Zigbee™, near field communication (NFC), Medical Implantable Communications Service (MICS), and/or the like. In another example, computing device 110 and AID device 160 may communicate via various wired protocols, including, without limitation, universal serial bus (USB), Lightning, serial, and/or the like. Although computing device 110 (and components thereof) and AID device 160 are depicted as separate devices, embodiments are not so limited. For example, in some embodiments, computing device 110 and AID device 160 may be a single device. In another example, some or all of the components of computing device 110 may be included in AID device 160. For example, AID device 160 may include processor circuitry, memory unit, and/or the like. In some embodiments, each of computing device 110 and AID device 160 may include a separate processor circuitry, memory unit, and/or the like capable of facilitating insulin infusion processes according to some embodiments, either individually or in operative combination. Embodiments are not limited in this context (see, for example, FIG. 2).

Figure 2:
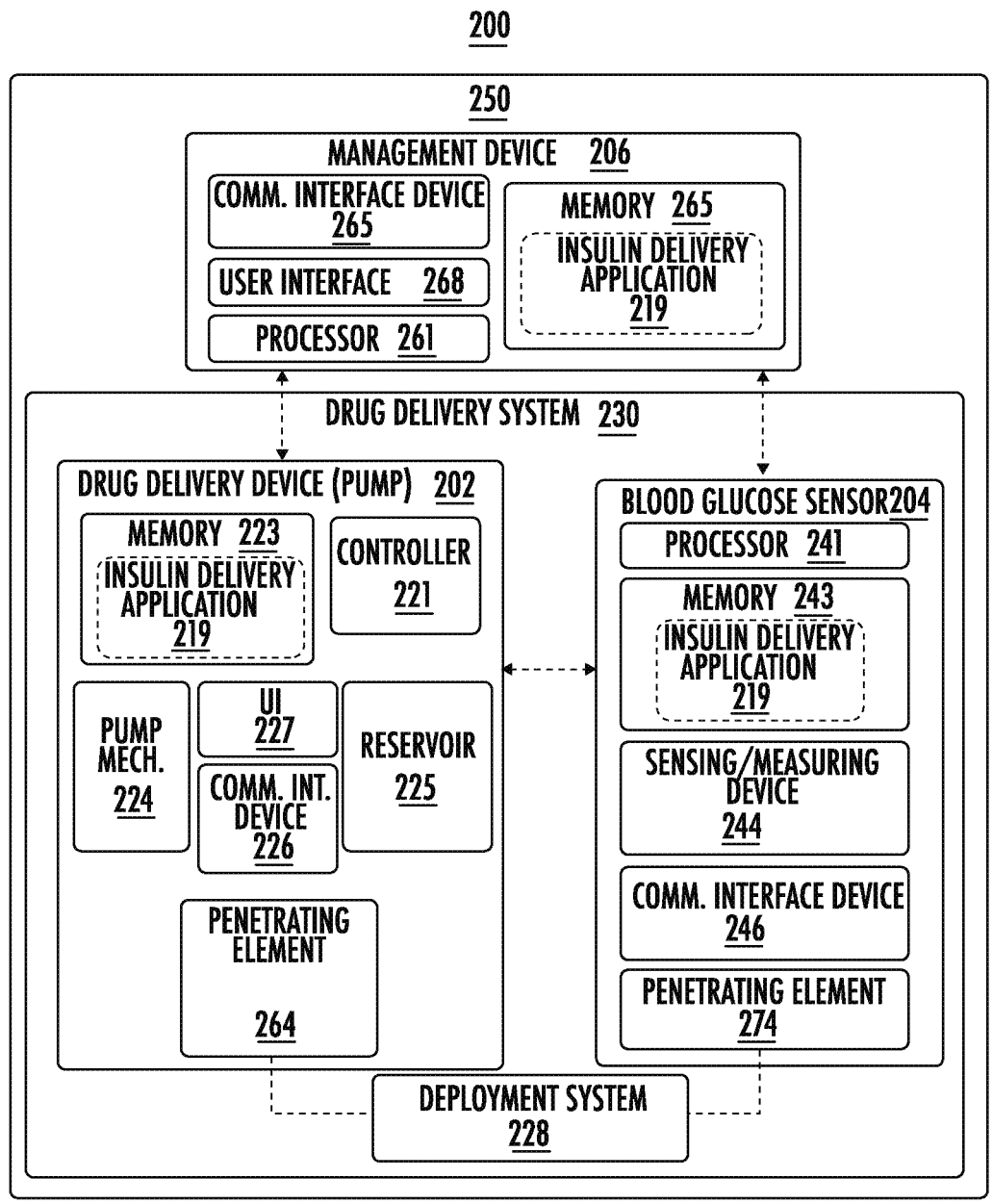
FIG. 2 illustrates a second exemplary operating environment in accordance with the present disclosure.

FIG. 2 illustrates a second exemplary operating environment in accordance with the present disclosure. More specifically, FIG. 2 illustrates an example of an operating environment 200 implementing a medicament delivery system according to some embodiments. In some embodiments, drug delivery system 250 may be an implementation of operating environment 100 of FIG. 1 (or vice versa).

As shown in FIG. 2, drug delivery system 250 may include a drug delivery device 202, a management device 206, and a blood glucose sensor 204. In some embodiments, drug delivery device 202 may be a wearable or on-body drug delivery device that is worn on the body of a patient or user. Drug delivery device 202 may include a pump mechanism 224 that may, in some examples, be referred to as a drug extraction mechanism or component, and a needle deployment component or insertion mechanism 228. In various examples, the pump mechanism 224 may include a pump or a plunger (not shown).

Deployment system 228 may, for example, include or be coupled to penetrating element 264 of drug delivery device 202, penetrating element 274 of blood glucose sensor 204, and/or any other fluid path components for coupling the stored liquid drug in reservoir 225 to the user. In some embodiments, penetrating element 264 may include a cannula that may form a portion of the fluid path component coupling the user to reservoir 225. After needle deployment component 228 has been activated, a fluid path (not shown) to the user is provided, and pump mechanism 224 may expel the liquid drug (for instance, insulin) from reservoir 225 to deliver the liquid drug to the user via the fluid path. The fluid path may, for example, include tubing (not shown) coupling wearable drug delivery device 202 to the user (e.g., tubing coupling the cannula to reservoir 225).

Wearable drug delivery device 202 may further include a controller 221 (for instance, the same or similar to processing circuitry 120) and a communications interface device 226. Controller 221 may be implemented in hardware, software, or a combination thereof. Controller 221 may, for example, be a processor, a logic circuit or a microcontroller coupled to a memory 223. Controller 221 may maintain a date and time as well as other functions (e.g., calculations or the like) performed by processors. Controller 221 may be operable to execute an automatic pancreas (AP) or AID application, for example, insulin delivery application 219 stored in memory 223 that enables controller 221 to direct operation of drug delivery device 202. In addition, controller 221 may be operable to receive data or information indicative of physiological characteristics of the user from mobile device 216, blood glucose sensor 205, management device 206, and/or the like.

In some embodiments, drug delivery device 202 may include or may be communicatively coupled to a blood glucose sensor 204. In some embodiments, blood glucose sensor 204 may be a CGM sensor. Blood glucose sensor 204 may be within the same device footprint as drug delivery device 202 within drug delivery system 230. In various embodiments, blood glucose sensor 204 may provide controller 221 with data indicative of measured or detected blood glucose (BG) levels of the user to provide a closed-loop AID system with drug delivery device 202

Management device 206 (for instance, a PMD) may be maintained and operated by the user or a caregiver of the user. Management device 206 may control operation of drug delivery device 202 and/or may be used to review data or other information indicative of an operational status of drug delivery device 202 or a status of the user. Management device 206 may be used to direct operations of drug delivery device 202. For example, management device 206 may be a dedicated personal diabetes management (PDM) device, a smartphone, a tablet computing device, other consumer electronic device including, for example, a desktop, a laptop, a tablet, or the like. Management device 206 may include a processor 261 and memory devices 265. In some embodiments, memory devices 265 may store an insulin delivery application 219 that may be or may include an AP or AID application including programming code that may implement delivery of insulin based on input from blood glucose sensor 204. In some embodiments, management device 206 may be or may operate in cooperation with a mobile device In an example, wearable drug delivery system 230 may be attached to the body of a user, such as a patient or diabetic, and may deliver any therapeutic agent, including any drug or medicine, such as insulin or the like, to a user. Wearable drug delivery system 230 may, for example, be a wearable device worn by the user. For example, wearable drug delivery system 230 may be directly coupled to a user (e.g., directly attached to a body part and/or skin of the user via an adhesive or the like) with drug delivery device 202 and blood glucose sensor 204 housed, coupled, or otherwise arranged in the same form factor. In an example, a surface of the wearable drug delivery system 230 may include an adhesive to facilitate attachment to a user, such as an adhesive associated with drug delivery system 230, drug delivery device 202, and/or blood glucose sensor 204. Wearable drug delivery system 230 may be referred to as a pump, or an insulin pump, in reference to the operation of expelling a drug from reservoir 225 for delivery of the drug to the user.

In an example, wearable drug delivery device 202 may include a reservoir 225 for storing the drug (such as insulin), penetrating element 264 (e.g., a needle or cannula) for delivering the drug into the body of the user (which may be done subcutaneously, intraperitoneally, or intravenously), and a pump mechanism 224, or other drive mechanism, for expelling the stored insulin from the reservoir 225, through a needle or cannula (not shown), and into the user. Reservoir 225 may be operable to store or hold a liquid or fluid, such as insulin or another therapeutic drug. Pump mechanism 224 may be fluidly coupled to reservoir 225, and communicatively coupled to controller 221. Wearable drug delivery device 202 may also include a power source (not shown), such as a battery, a piezoelectric device, or the like, for supplying electrical power to pump mechanism 224 and/or other components (such as controller 221, memory 223, and communication interface device 226) of wearable drug delivery device 202.

In an example, blood glucose sensor 204 may be a CGM device communicatively coupled to processor 261 or controller 221 and may be operable to measure a blood glucose value at a predetermined time interval, such as approximately every 5 minutes, or the like. Blood glucose sensor 204 may provide a number of blood glucose measurement values to the insulin delivery application 219 operating on the respective devices. In another example, blood glucose sensor 204 may be a manual blood glucose sensor measuring blood glucose in blood from a fingerstick method.

Wearable drug delivery device 202 may operate to provide a fluid (for instance, a fluid medicament, insulin, and/or the like) stored in reservoir 225 to the user based on information (for instance, insulin dosage information 136) determined via an infusion process according to some embodiments. For example, wearable drug delivery device 202 may contain analog and/or digital circuitry that may be implemented as a controller 221 (or processor) for controlling the delivery of the drug or therapeutic agent. The circuitry used to implement controller 221 (the same or similar to processing circuitry 120) may include discrete, specialized logic and/or components, an application-specific integrated circuit, a microcontroller or processor that executes software instructions, firmware, programming instructions or programming code stored in memory 223, or any combination thereof. For example, controller 221 may execute a control algorithm, such an AID algorithm of insulin delivery application 219, that may make controller 221 operable to cause pump mechanism 224 to deliver doses of the drug or therapeutic agent to a user at predetermined intervals or as needed to bring blood glucose measurement values to a target blood glucose value based on the insulin infusion process according to some embodiments.

The devices in system 250, such as management device 206, wearable drug delivery device 202, and sensor 204, may also be operable to perform various functions including controlling wearable drug delivery device 202. For example, management device 206 may include a communication interface device 264, a processor 261, and a management device memory 263. In some embodiments, management device memory 263 may store an instance of insulin delivery application 219.

In some embodiments, sensor 204 of system 250 may be a continuous glucose monitor (CGM), that may include a processor 241, a memory 243, a sensing or measuring device 244, and/or a communication interface device 246. Sensor 204 may include a penetrating element 274 inserted into the skin of a user to obtain fluid samples for use by sensing device 244. Memory 243 may store an instance of insulin delivery application 219 as well as other programming code and may be operable to store data related to insulin delivery application 219.

Sensor 204 and wearable drug delivery device 202 may be incorporated into the same unit, for example, within one or more housings. For example, sensor 204 may be a part of wearable drug delivery device 202 and contained within the same housing of wearable drug delivery device 202. Blood glucose measurement information (whether automatically or manually (fingerstick) determined) determined by sensor 204 may be provided to wearable drug delivery device 202 and/or management device 206, which may use the measured blood glucose values to determine an infusion amount or rate based on an insulin infusion process according to some embodiments.

In some examples, wearable drug delivery device 202 and/or management device 206 may include a user interface 227 and 268, respectively, such as a keypad, a touchscreen display, levers, buttons, a microphone, a speaker, a display, or the like, that is operable to allow for user input and/or output to user (for instance, a display of information).

Figure 3A:
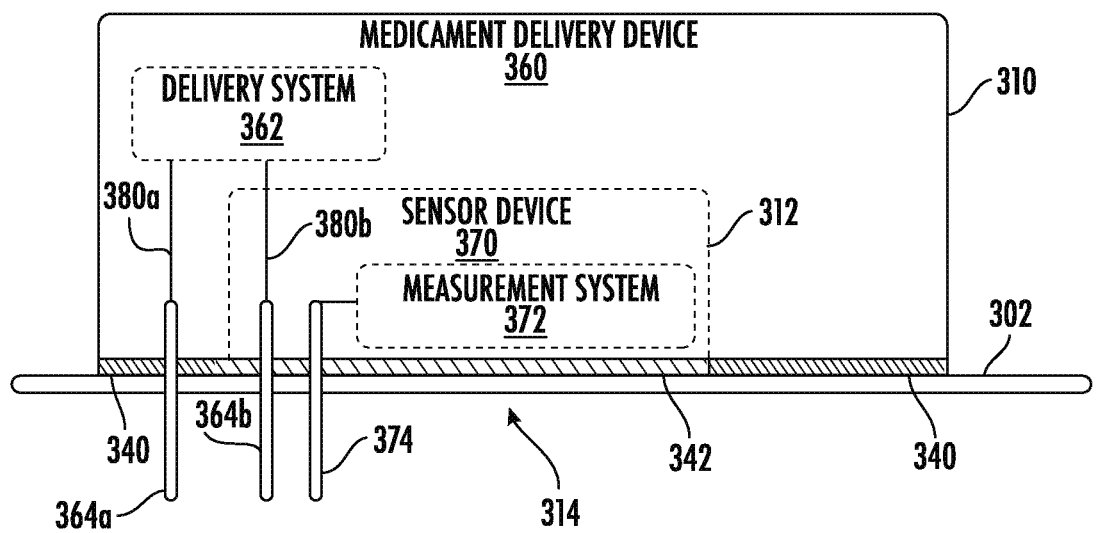
FIGS. 3A and 3B illustrate a first embodiment of a medicament delivery device in accordance with the present disclosure.
Figure 3B:
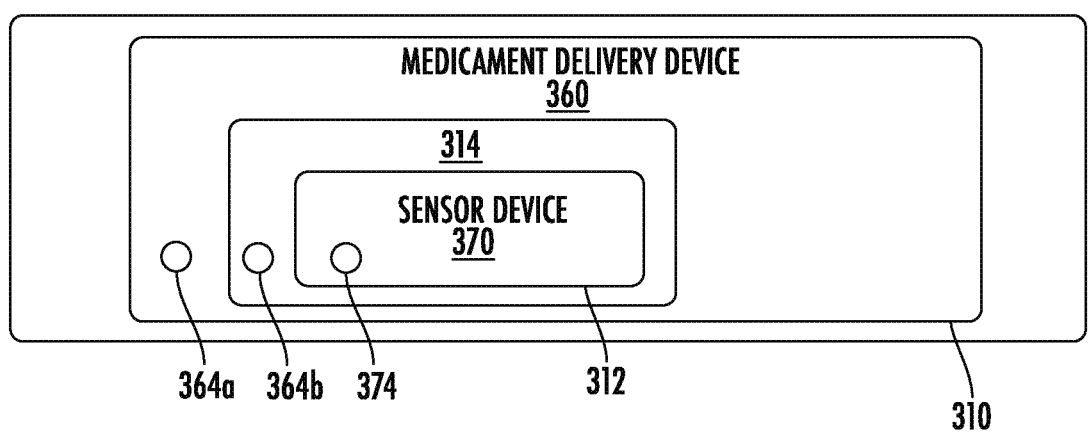

FIGS. 3A and 3B illustrate a first embodiment of a medicament delivery device in accordance with the present disclosure. FIG. 3A depicts a side view of a medicament delivery device 360 having a medicament delivery system 362 co-located within a housing 310 of medicament delivery device 360 with a sensor device 370. Housing 310 of medicament delivery device 360 may be attached to the skin 302 of a patient via adhesive 340. In some embodiments, sensor device 370 may be a CGM sensor having a housing 312 surrounding a measurement system 372, for example, configured to determine blood glucose levels from blood sampled via sensor 374. Housing 310 may have an opening 314 for CGM sensor 370 which, in some embodiments, may be attached to skin 302 via adhesive 342. Although CGM sensors are used as example sensor devices, embodiments are not so limited, as any type of device or sensor device having a penetrating element may operate according to some embodiments disclosed within the present disclosure.

Delivery system 362 may be coupled to one or more fluid paths 380a, 380b in fluid communication with penetrating elements 364a, 364b. In some embodiments, delivery system 362 may have a single fluid path 380a that is arranged outside of CGM sensor 370 (see, for example, FIGS. 6A and 6B). In other embodiments, delivery system 362 may have a delivery path 380b arranged within housing 312 of CGM sensor 370 (see, for example, FIGS. 4A, 4B, 5A, and 5B). FIG. 3B depicts a bottom view of medicament delivery device 360 showing the footprint of medicament delivery device 360 and sensor device 370 within opening 314 according to some embodiments.

In order to improve patient experience, it is desired to co-locate an insulin pump and CGM into one footprint. This may prevent multiple devices being spread around the body (e.g., less required space or "real estate") as well as maximizing ease of use by only having to deal with a single wearable unit. Conventional systems for co-locating an insulin pump and CGM rely on separate assemblies that require separate steps for injecting their penetrating components (e.g., cannula for pump and sensor for CGM). A medicament delivery device configured according to some embodiments may provide systems and methods that would remove the need for additional injection steps. For example, a deployment mechanism in the pump may introduce the cannula for insulin infusion into the skin and may also simultaneously or substantially simultaneously inject a CGM sensor into the skin. Accordingly, some embodiments may eliminate the need for multiple injection mechanisms and additional steps by patients.

Figure 4A:
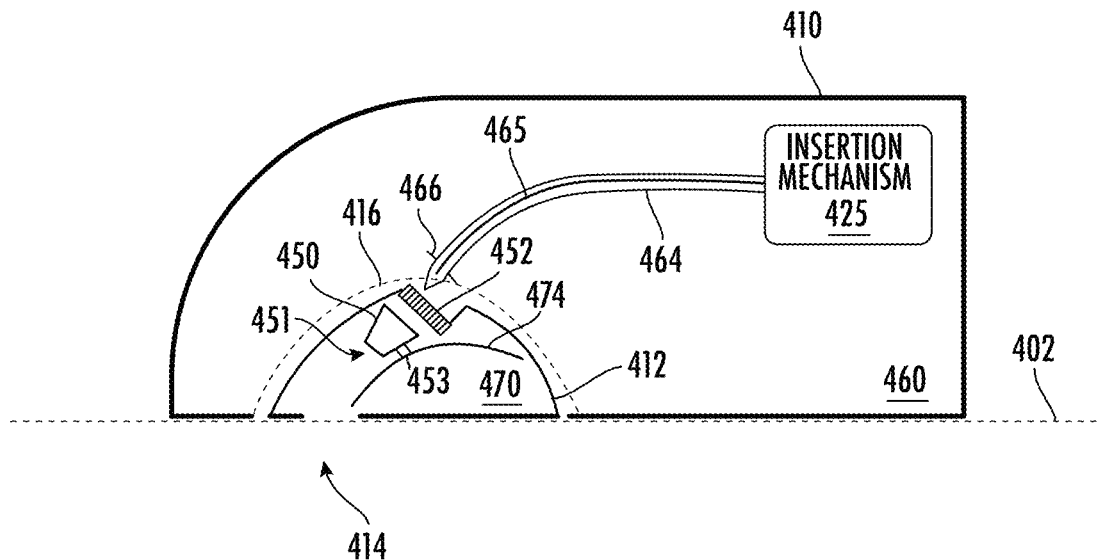
FIGS. 4A-4D illustrate a second embodiment of a medicament delivery device in accordance with the present disclosure.

FIGS. 4A-4D illustrate a second embodiment of a medicament delivery device in accordance with the present disclosure. As shown in FIGS. 4A, a medicament delivery device 460 may include a housing 410 having a sensor device 470 arranged therein. A bottom portion of housing 410 may be attached to skin 402 of a patient, for example, via an adhesive layer. In various embodiments, sensor device 470 may include a CGM sensor. In some embodiments, CGM sensor 470 may include a penetrating element 474, for example, a sensor, arranged within a housing 412. At least a portion of CGM sensor 470 may be arranged within an opening 414 in the bottom of housing in contact with skin 402. In exemplary embodiments, a bottom portion of housing 412 may be individually attached to skin 402, for example, via an adhesive layer. Accordingly, in some embodiments, housing 410 and housing 412 may be independently attached to skin. In this manner, housing 410 may be removed from skin 402 while housing 412 may remain attached to skin 402 (for example, to replace medicament delivery device 460).

In some embodiments, housing 410 may include a mating element 416 configured to mate, engage, or otherwise contact at least a portion of CGM sensor 470. In various embodiments, mating element 416 may be configured to facilitate proper positioning (for instance, "lining up") of medicament delivery device 460 with CGM sensor 470 and/or portions thereof. In exemplary embodiments, mating element 416 may include one or more protrusions, grooves, tabs, slots, flanges, and/or other structural components configured to engage corresponding structure(s) of CGM sensor 470. In some embodiments, mating element 416 may be or may be coupled to an internal bottom surface of housing 410 arranged to contact or be in close proximity to CGM sensor 470 when medicament delivery device 460 is installed over CGM sensor 470. In one example, mating element 416 may include a mating/corresponding surface on inner side of housing 410 that mates with outer surface of housing 412, for instance, to facilitate a user lining up the two components when placing the devices on the skin to align the insertion mechanism properly.

A fluid delivery penetration element 464, such as a cannula 464 having a needle 465, for instance, an introducer needle, arranged therein. Cannula 464 and/or needle 465 may be a part of a fluid path of a pump system (not shown). An insertion mechanism 425 may be coupled to cannula 464 and/or needle 465 and configured to force cannula 464 and/or needle 465 toward skin 402. Insertion mechanism 425 may use various mechanical methods, electrical methods, or combinations thereof to force cannula 464 and/or needle 465 toward skin 402.

A seal 452 may be arranged on a portion of housing 412. In some embodiments, seal 452 may be formed of a deformable material that may be penetrated by cannula 464 and/or needle 465, such as rubber, a polymer, or a combination thereof. A penetrating element 474, such as a sensor, may be coupled to a catch 450 configured to engage cannula 464 and/or needle 465 or a portion thereof. In some embodiments, catch 450 may be configured to engage cannula 464 and/or needle 465, for instance, via one or more engagement elements 466, such as a protrusion, groove, slot, on cannula 464 and/or needle 465. Although engagement element 466 is depicted as a protrusion in FIG. 4A, embodiments are not so limited. For example, in some embodiments, engagement element 466 may be or may include a groove, slot, recess, cavity, hole, and/or the like in cannula 464 and/or needle 465 configured to be engaged (or "caught") by a corresponding protruding element within catch 450 (not shown), for example, after cannula 464 and/or needle 465 has gone through seal 452.

In some embodiments, catch 450 may be or may include a funnel, clip, or other element configured to engage cannula 464 and/or needle 465 and/or a portion thereof. Catch 450 may be coupled to sensor 474 via a connector 453 and may include an opening 451 so that an end portion of cannula 464 and/or needle 465 may pass through when inserted into skin 402 (see, for example, FIG. 4B).

Figure 4B:
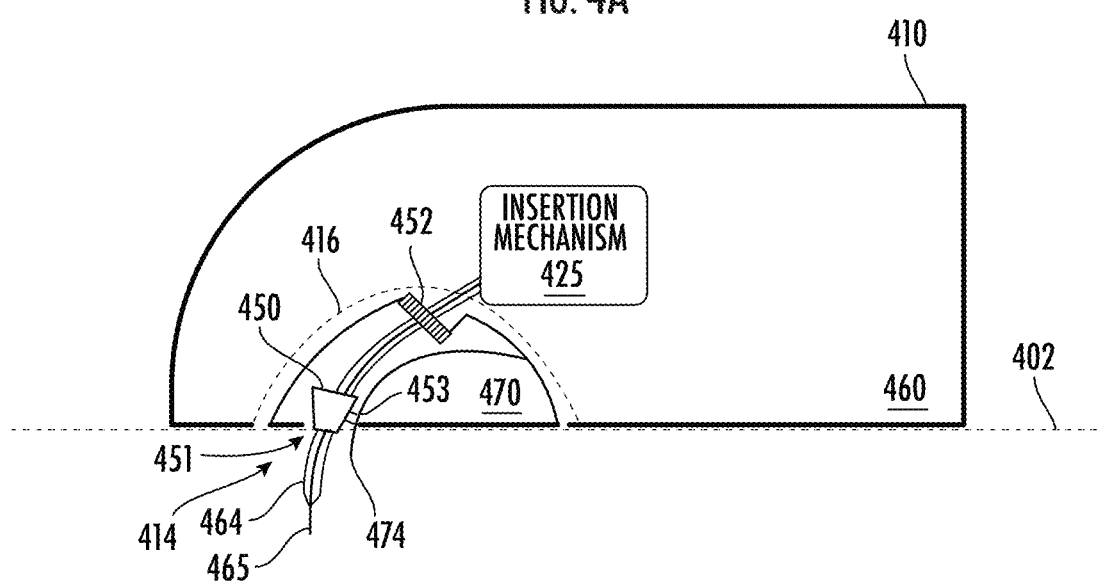

In general, FIG. 4A depicts medicament delivery device 460 in an initial, inactive, or retracted state in which the penetrating elements (e.g., 464, 465, and 470) are not inserted into skin 402. FIG. 4B depicts medicament delivery device 460 in an active or inserted state in which the penetrating elements have been inserted into skin upon activation of insertion mechanism 425.

As shown in FIG. 4B, insertion mechanism 425 forces cannula 464 and/or needle 465 in a path towards skin. Cannula 464 and/or needle 465 penetrates seal 452 and engages catch 450, driving catch 450 toward skin 402. Because catch 450 is coupled to sensor 474, sensor 474 is also driven toward skin. Cannula 464 and/or needle 465 may be inserted into skin 402 simultaneously with sensor 474. In some embodiments, engagement elements 466 may be arranged on cannula 464 and/or needle 465 to engage an inner surface of catch 450 to allow a predetermined portion of cannula 464 and/or needle 465 to extend beyond opening 451 and into skin 402.

In various embodiments, insertion mechanism 425 may be retracted to remove needle 465 from the patient, leaving cannula 464 in skin 402. In some embodiments, sensor 474 may be arranged within or outside of an introducer element (not shown), such as a sensor introducer needle, similar to the needle 465 that is inside cannula 464 and which aids cannula 464 in penetrating skin 402. Retraction of needle 465 from patient may also remove the sensor introducer needle, while sensor 474 remains in skin 402.

Accordingly, in some embodiments, a CGM device arranged within the housing of fluid delivery device may include a pierceable rubber or polymer seal or septum on a top side of a housing of the CGM device. A cannula/needle mechanism is configured to be forced through the seal to catch or engage a funnel, clip, or other catch feature, which is coupled to a sensor (for instance, a CGM sensor of a CGM device). After catching, the cannula/needle mechanism drags, pushes, or otherwise forces the catch feature. The assembly of the cannula/needle, CGM sensor, and catch feature moves forward toward the skin of the wearer to force the cannula/needle and CGM sensor into the skin. During retraction, introducer needles associated with the cannula and/or CGM sensor may be pulled back, leaving the cannula and CGM in the patient.

When the medicament delivery device (or "pod") has completed its delivery, for example, and the insulin reservoir is empty, and needs to be changed, it may be removed and the CGM device 470 may be maintained on the skin. For example, in various embodiments, housing 410 may be removed (for example, for replacement of a new insulin pump device) while maintaining CGM device 470 on the same location of the patient and CGM sensor 474 in skin 402 (see, for example, FIGS. 4C and 4D). When housing 410 and cannula 464 are removed, the hole formed in seal 452 by cannula 464 and/or needle 465 may close up (or "heal") to maintain the water resistance of CGM device 470.

Figure 4C:
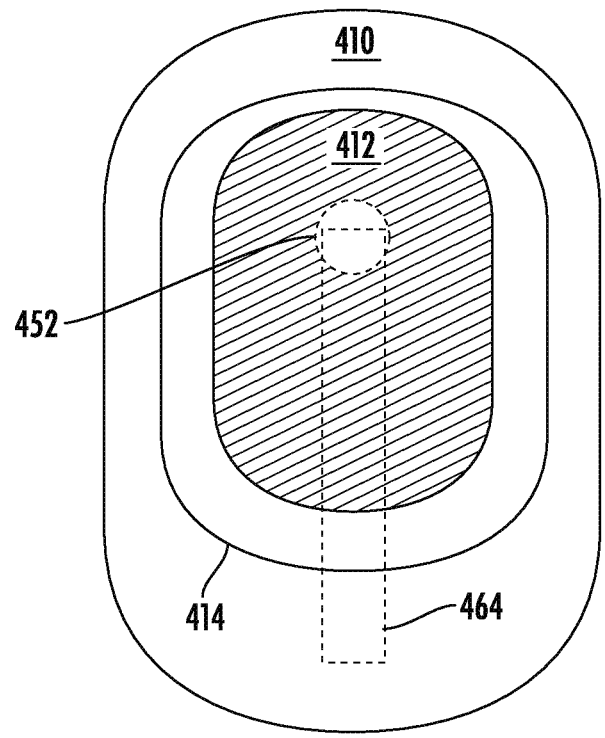
Figure 4D:
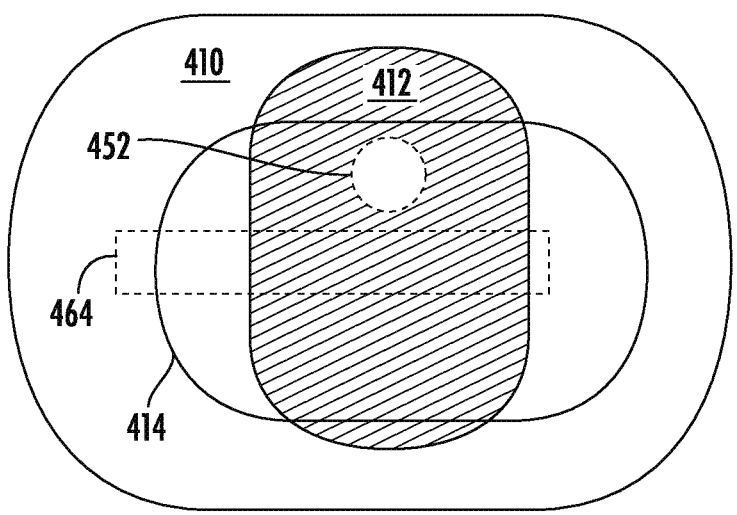

FIGS. 4C and 4D depict bottom views of medicament delivery device during exchange of an insulin pump housing. As shown in FIG. 4C, in a first installation, the alignment of cannula 464 may be arranged to engage catch 452 when insertion mechanism is activated. Accordingly, insertion of cannula 464 may cause CGM sensor 474 to be installed simultaneously. However, in a subsequent installation of housing 410, CGM sensor 474 is already inserted into the skin of the patient. Accordingly, housing 410 may be arranged such that movement of cannula 464 into the skin of the patient via insertion mechanism will miss catch 452. For example, as depicted in FIG. 4D, in a subsequent installation, housing 410 may be affixed to the skin at an angle (for example, a 90 degree angle) relative to housing 412 such that the alignment of cannula 464 will miss catch 452 such that cannula 464 (and/or needle 465) may bypass housing 412 of CGM device 470. Alternatively, in a subsequent installation, housing 410 may be affixed to the skin at a completely different location on the patient's body.

In some embodiments, medicament delivery device 460 may initially be provided to the patient in the orientation depicted in FIG. 4C, with housing 410 coupled to housing 412. A patient may initially attach medicament delivery device 460 and CGM device 470 to skin 402 by removing individual adhesive areas associated with medicament delivery device 460 and CGM device 470. After the initial installation, the patient may remove housing 410 while CGM device 470 is retained on the skin (which may be removed through a separate removal process).

Figure 4E:
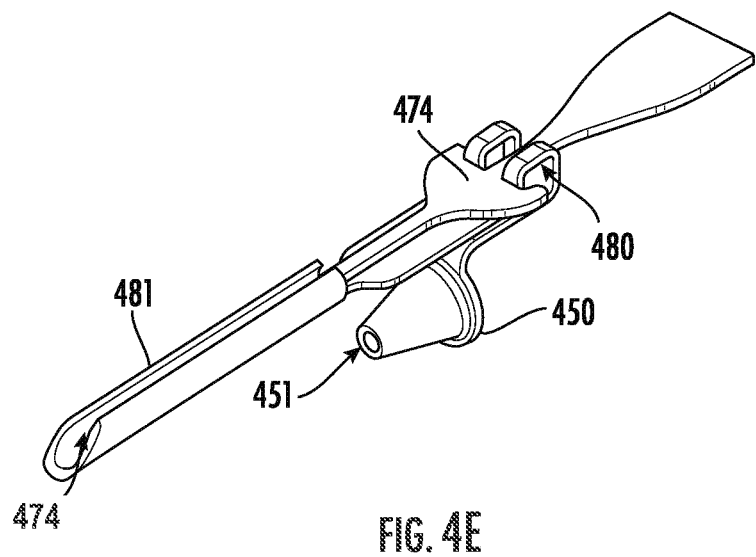
FIGS. 4E-4G illustrate embodiments of a sensing penetrating element and a driving element of the embodiment depicted in FIGS. 4A-4D in accordance with the present disclosure.
Figure 4F:
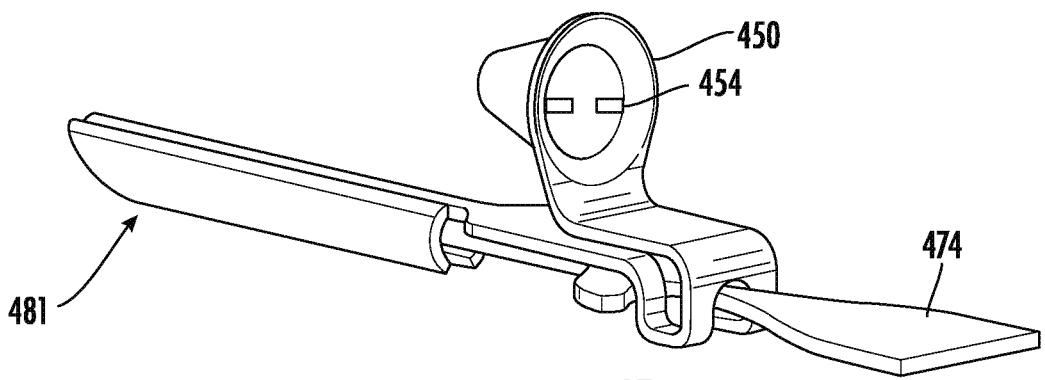
Figure 4G:
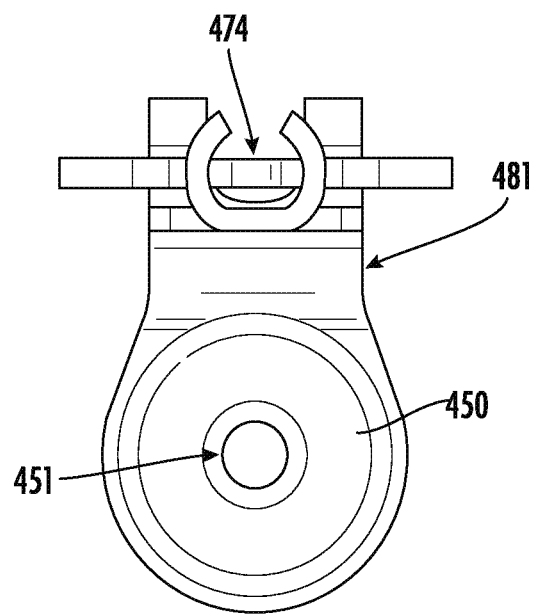

FIGS. 4E-4G illustrate embodiments of a sensing penetrating element and a driving element of the embodiment depicted in FIGS. 4A-4D in accordance with the present disclosure. As shown in FIGS. 4E-4G, a CGM sensor 474 may be arranged within an introducer needle 481 configured to protect sensor during insertion and to pierce the skin to push CGM sensor 474 into the skin. In some embodiments, introducer needle 481 may be formed of metal, a polymer, or a combination thereof. Referring to FIG. 4F, an inner portion of catch 450 may include engagement elements 454 to engage a portion of cannula (for instance, cannula 464), such as corresponding engagement elements 466. For example, engagement elements 454 may include protrusions, bumps, ridges, teeth, recesses, cavities, and/or the like.

Figure 5A:
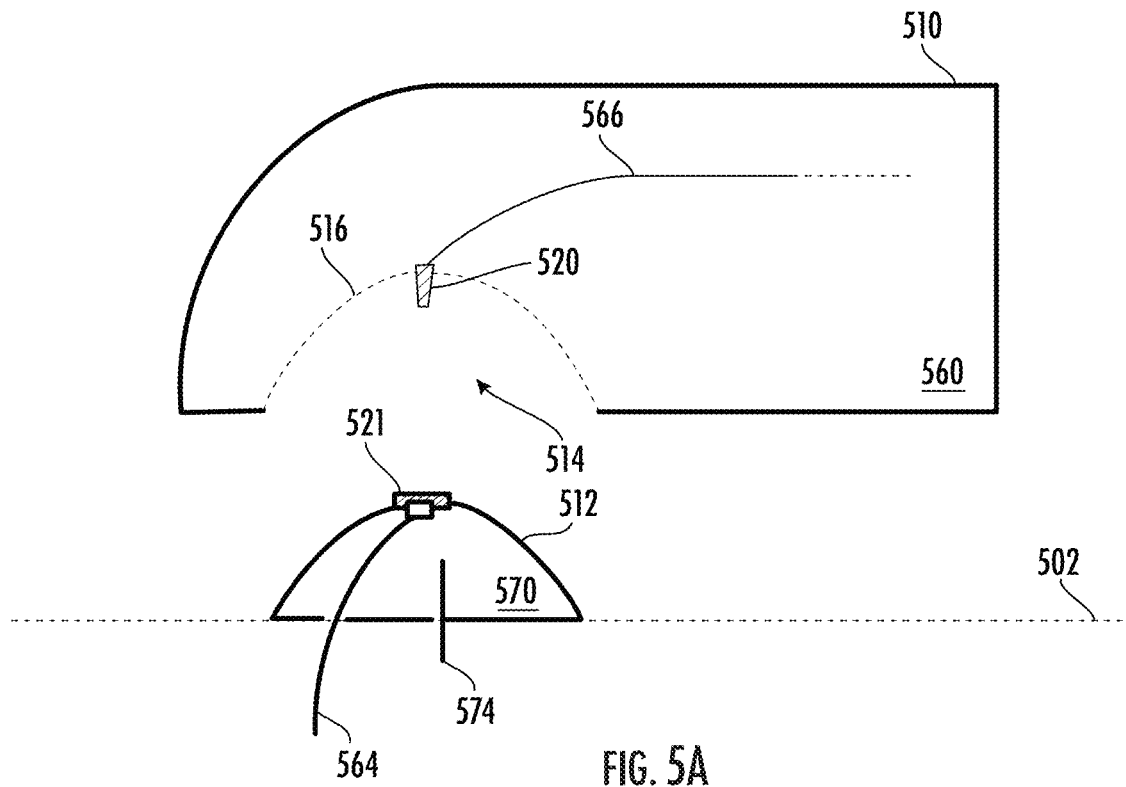
FIGS. 5A and 5B illustrate a third embodiment of a medicament delivery device in accordance with the present disclosure.
Figure 5B:
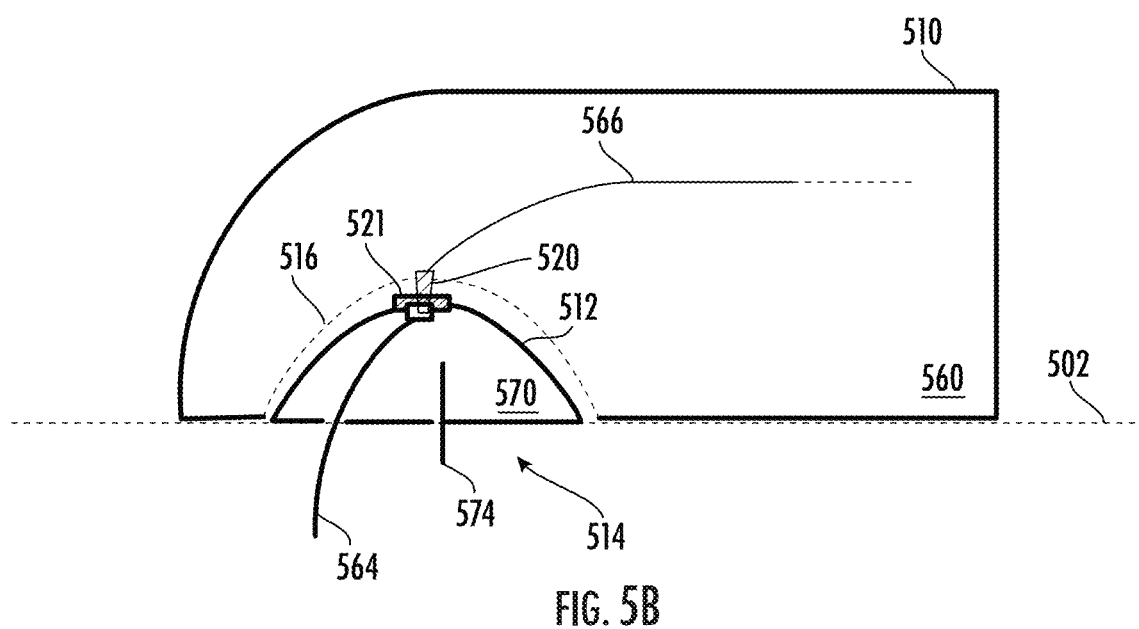

FIGS. 5A and 5B illustrate a third embodiment of a medicament delivery device in accordance with the present disclosure. As shown in FIG. 5A, a medicament delivery device 560 may have a fluid path 566 in fluid communication with a medicament delivery system, for example, an insulin delivery pump system. Fluid path 566 may have a needle 520 arranged on an end thereof. In various embodiments, medicament delivery device 560 may include an AID device 560. In some embodiments, AID device 560 may have a housing 510 with an opening 514 configured to receive a sensor device 570, such as a CGM device.

CGM device 570 may have a housing 512 having a septum (or seal) 521 arranged on a portion thereof. A fluid delivery penetration element 564, such as a fluid path (including, for example, a cannula and/or needle), may be coupled to septum 521. A penetrating sensor element 574, such as a CGM sensor, may be arranged within CGM device 570 for sensing blood glucose of a patient. In some embodiments, CGM sensor 574 may be associated with an introducer needle or other introducer device (see, for example, FIGS. 4E-4G).

In some embodiments, CGM device 570 may be attached to skin 502 by pressing CGM device 570 onto skin 502 to adhere an adhesive layer on a bottom portion of CGM device 570 to the patient. Cannula 564 and CGM sensor 570 may protrude form the bottom portion of housing 512. Accordingly, when CGM device 570 is pressed against skin 502, cannula 564 and CGM sensor 574 may simultaneously be inserted into skin 502 in a single insertion step. In other embodiments, a mechanical or electro-mechanical insertion mechanism (not shown) may be operatively coupled with CGM device 570 for inserting fluid path 564 and CGM sensor 574 in the single insertion step after CGM device 570 is affixed to the skin.

In some embodiments, housing 516 may include a mating element 516 configured to mate, engage, or otherwise contact at least a portion of CGM sensor 570. In various embodiments, mating element 516 may be configured to facilitate proper positioning (for instance, "lining up") of medicament delivery device 560 with CGM sensor 570 and/or portions thereof. In exemplary embodiments, mating element 516 may include one or more protrusions, grooves, tabs, slots, flanges, and/or other structural components configured to engage corresponding structure(s) of CGM sensor 570. In some embodiments, mating element 516 may be or may be coupled to an internal bottom surface of housing 510 arranged to contact or be in close proximity to CGM sensor 570 when medicament delivery device 560 is installed over CGM sensor 570. In one example, mating element 516 may include a mating/corresponding surface on inner side of housing 510 that mates with outer surface of housing 512, for instance, to facilitate a user lining up the two components when placing the devices on the skin to align the insertion mechanism appropriately.

Referring to FIG. 5B, fluid path 566 may be put into fluid communication with fluid path 564 by installing housing 510 onto or around housing 512 such that needle 520 penetrates septa 521 and fluidically engages fluid path 564. In some embodiments, needle 520 may engage fluid path 564 to form a water-tight or hermetic seal. For example, needle 520 may form a friction fit with fluid path 564.

In some embodiments, medicament delivery device 560 may initially be provided to the patient with fluid path 566 coupled to fluid path 564 via needle 520. Housing 510 may be removed from skin 502 for replacement, for example, when an insulin reservoir is empty. A new housing 510 may be installed over CGM device 570 by inserting a needle 520 of the new housing 510 through septum 521 to form a completed fluid path of path 564 and path 566.

Figure 6A:
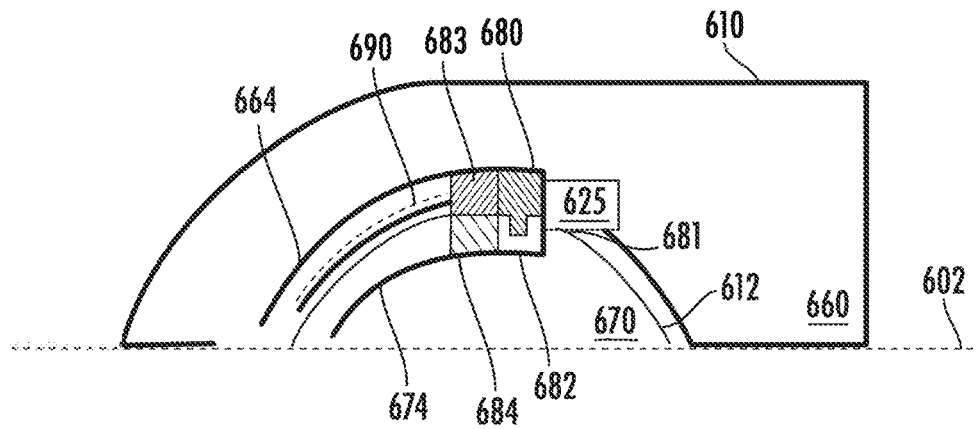
FIGS. 6A and 6B illustrate a fourth embodiment of a medicament delivery device in accordance with the present disclosure.
Figure 6B:
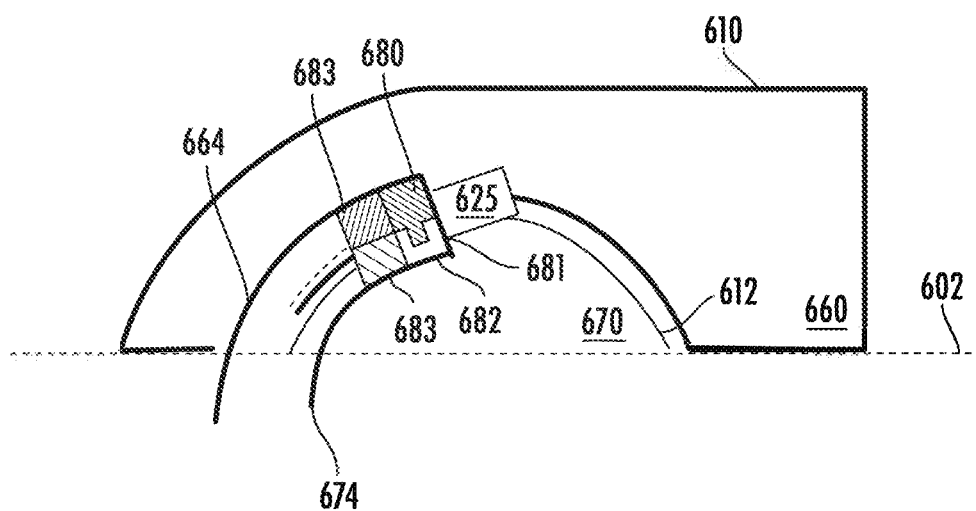

FIGS. 6A and 6B illustrate a fourth embodiment of a medicament delivery device in accordance with the present disclosure. As shown in FIG. 6A, a medicament delivery device 660 may include a housing 610 having a fluid delivery penetration element 664 and a sensor device 670 arranged therein. Fluid delivery penetration element 664 may be or may include a cannula and/or a needle (for example, an introducer needle). In some embodiments, medicament delivery device 660 may be or may include an AID device and a sensor device 670 may be or may include a CGM device. A penetrating sensor element 674, such as a CGM sensor, may be arranged within a housing 612 of CGM device 670. In some embodiments, CGM sensor 674 may include an introducer needle (see, for example, FIGS. 4E-4G).

CGM sensor 670 and cannula 664 may be coupled to each other. For example, CGM sensor 670 and cannula 664 may be coupled to each other via one or more coupling elements, such as driving elements 683, 684 and/or interlocks 680, 682. For example, interlock 680 may be coupled to cannula 664 that has an interface 681 operative to connect interlock 680 with interlock 682 that is connected to CGM sensor 670. For example, interface 681 may include a protrusion or other element configured to form a lock fit, friction fit, or other rigid attachment between interlock 680 and interlock 682. Although a specific interface 681 is depicted in FIGS. 6A and 6B, embodiments are not so limited. For example, various other forms for coupling CGM sensor 670 and cannula 664 to each other may be used according to some embodiments. In various embodiments, CGM sensor 674 and cannula 664 are coupled to each other in a manner such that movement of one of CGM sensor 674 and cannula 664 may cause corresponding movement of the other of CGM sensor 674 and cannula 664. For example, a force provided by an insertion mechanism 625 may force one or both of CGM sensor 674 and cannula 664 to move toward skin 602. Because CGM sensor 674 and cannula 664 are coupled to each other, both will move toward skin 602 for insertion in a single insertion step.

In some embodiments, a track 690 may be arranged on a portion of AID device 560 or CGM device 570, such as on an outer portion of housing 612 or a bottom portion of housing. One or both of drive elements 683, 684 may be configured to ride down track 690 when insertion mechanism 625 is activated to force drive elements 683, 684 toward skin 602. Upon activation of insertion mechanism 625, both cannula 664 and CGM sensor 674 may ride along track 690 for insertion into skin 602 in a single simultaneous or substantially simultaneous insertion step. In some embodiments, insertion mechanism 625 may include a mechanical mechanism, a magnetic mechanism, a spring mechanism, an electrical mechanism, or a combination thereof configured to engage one or more of drive elements 683, 684 to force cannula 664 and CGM sensor 674 into skin 602.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A fluid delivery device, comprising:
 a fluid delivery penetration element operative to be inserted into a patient to deliver a fluid from a fluid delivery system to the patient;
 a sensor device comprising a sensor penetration element operative to be inserted into the patient to measure patient information of the patient;
 a catch coupled to the sensor penetration element; and
 an activation device operative to force the fluid delivery penetration element to be inserted into a portion of the patient, the fluid delivery penetration element to engage the catch when traveling toward the portion of the patient to force the sensor penetration element into the portion of the patient.

2. The fluid delivery device of claim 1, the fluid delivery penetration element comprising at least one of a cannula and a needle.

3. The fluid delivery device of claim 1, the sensor device comprising a continuous glucose monitoring (CGM) device, wherein the sensor penetration element comprises a CGM sensor.

4. The fluid delivery device of claim 1, the sensor device comprising a housing having a seal arranged on an outer surface thereof, the fluid delivery penetration element to pierce the seal as the fluid delivery penetration element travels to engage the catch.

5. The fluid delivery device of claim 1, the fluid delivery penetration element comprising at least one engagement element operative to facilitate engagement of the fluid delivery penetration element with the catch.

6. The fluid delivery device of claim 1, the catch comprising a funnel.

7. The fluid delivery device of claim 1, the catch arranged on an insertion needle coupled to the sensor penetration element.

8. The fluid delivery device of claim 1, the fluid delivery device and the sensor device independently coupled to the portion of the patient via separate adhesive areas.

9. The fluid delivery device of claim 1, the activation device operative to retract the fluid delivery penetration element from the portion of the patient without removing the sensor penetration element from the portion of the patient.

\* \* \* \* \*